United States Patent
Hwang et al.

(10) Patent No.: US 9,342,209 B1
(45) Date of Patent: May 17, 2016

(54) COMPILATION AND PRESENTATION OF USER ACTIVITY INFORMATION

(75) Inventors: Douglas C. Hwang, New York, NY (US); Douglas S. Goldstein, Riverdale, NY (US); Ajay Arora, New York, NY (US); Guy A. Story, Jr., New York, NY (US)

(73) Assignee: Audible, Inc., Newark, NJ (US)

( * ) Notice: Subject to any disclaimer, the term of this patent is extended or adjusted under 35 U.S.C. 154(b) by 431 days.

(21) Appl. No.: 13/593,388

(22) Filed: Aug. 23, 2012

(51) Int. Cl.
*G06F 3/01* (2006.01)
*G06F 3/0481* (2013.01)

(52) U.S. Cl.
CPC .................................. *G06F 3/0481* (2013.01)

(58) Field of Classification Search
CPC ....... G06F 3/0481; G06F 17/241; H04N 5/74; G06Q 10/10; G11B 27/105
USPC .......................................................... 715/730
See application file for complete search history.

(56) References Cited

U.S. PATENT DOCUMENTS

| | | | |
|---|---|---|---|
| 5,008,853 A * | 4/1991 | Bly et al. ...................... 715/751 |
| 6,618,593 B1 * | 9/2003 | Drutman ............ G08B 21/0222 |
| | | | 342/357.31 |
| 7,234,117 B2 * | 6/2007 | Zaner et al. .................... 715/758 |
| 7,363,339 B2 * | 4/2008 | Delany et al. ................. 709/202 |
| 7,593,740 B2 * | 9/2009 | Crowley et al. ............ 455/456.3 |
| 7,634,492 B2 * | 12/2009 | Parker et al. |
| 7,689,922 B2 * | 3/2010 | Zaner et al. .................... 715/751 |
| 7,702,728 B2 * | 4/2010 | Zaner et al. .................... 709/205 |
| 7,739,210 B2 * | 6/2010 | Horvitz et al. ................... 706/21 |
| 7,840,903 B1 * | 11/2010 | Amidon et al. ................ 715/757 |
| 7,970,350 B2 * | 6/2011 | Sheynman et al. ........... 455/41.1 |
| 8,019,692 B2 * | 9/2011 | Rosen ............................ 705/319 |
| 8,045,482 B2 * | 10/2011 | Davis et al. .................... 370/254 |
| 8,046,411 B2 * | 10/2011 | Hayashi et al. ............... 709/204 |
| 8,244,830 B2 * | 8/2012 | Robinson et al. ............. 709/217 |
| 8,271,529 B2 * | 9/2012 | Qiu ............................... 707/784 |
| 8,284,990 B2 * | 10/2012 | Ma et al. ........................ 382/103 |
| 8,321,527 B2 * | 11/2012 | Martin et al. .................. 709/217 |
| 8,352,874 B2 * | 1/2013 | Zaner et al. .................... 715/758 |
| 8,353,012 B2 * | 1/2013 | Del Real ............. G06F 21/6218 |
| | | | 705/326 |
| 8,356,251 B2 * | 1/2013 | Strober ......................... 715/740 |
| 8,364,514 B2 * | 1/2013 | Macbeth et al. ............. 705/7.25 |
| 8,458,258 B2 * | 6/2013 | Beaven et al. ................ 709/204 |
| 8,463,295 B1 * | 6/2013 | Caralis et al. .............. 455/456.3 |
| 8,577,405 B2 * | 11/2013 | Davis et al. .................... 455/518 |
| 8,589,275 B2 * | 11/2013 | Cirulli et al. ................ 705/36 R |
| 8,601,027 B2 * | 12/2013 | Behforooz et al. ........... 707/790 |
| 8,601,055 B2 * | 12/2013 | Smith et al. ................... 709/204 |
| 8,655,404 B1 * | 2/2014 | Singh et al. ................. 455/556.1 |
| 8,688,086 B1 * | 4/2014 | Cope et al. ................. 455/414.2 |
| 8,700,710 B1 * | 4/2014 | Gallagher et al. ............ 709/204 |
| 8,732,590 B2 * | 5/2014 | Barker et al. ................. 715/753 |

(Continued)

*Primary Examiner* — Jung-Mu Chuang
(74) *Attorney, Agent, or Firm* — Knobbe, Martens, Olson & Bear, LLP

(57) ABSTRACT

Features are disclosed for generating presentations of information about activities of users of personal devices. Any number of personal devices may transmit information about activities performed by users associated with the personal devices. The information can be transmitted to a management component configured to compile the information, supplement the information with information from third-party sources, and generate presentations. The presentations may be based on templates associated with particular users or groups of users. The presentations may include, but are not limited to, visual, audio, and textual content.

24 Claims, 5 Drawing Sheets

(56) References Cited

U.S. PATENT DOCUMENTS

| | | | | |
|---|---|---|---|---|
| 8,812,028 | B2* | 8/2014 | Yariv et al. | 455/456.3 |
| 8,818,834 | B1* | 8/2014 | Rastovich et al. | 705/7.19 |
| 8,836,530 | B1* | 9/2014 | Bowers et al. | 340/686.6 |
| 8,868,542 | B2* | 10/2014 | Kimball et al. | 707/710 |
| 8,893,025 | B2* | 11/2014 | Vance et al. | 715/753 |
| 2002/0129135 | A1* | 9/2002 | Delany | G06F 21/41 709/223 |
| 2004/0041836 | A1* | 3/2004 | Zaner et al. | 345/751 |
| 2005/0091595 | A1* | 4/2005 | Shappell et al. | 715/700 |
| 2005/0177614 | A1* | 8/2005 | Bourne | 709/200 |
| 2006/0009249 | A1* | 1/2006 | Fu et al. | 455/518 |
| 2006/0224583 | A1* | 10/2006 | Fikes et al. | 707/6 |
| 2006/0240856 | A1* | 10/2006 | Counts | H04W 4/08 455/518 |
| 2006/0267997 | A1* | 11/2006 | Walls et al. | 345/581 |
| 2006/0270419 | A1* | 11/2006 | Crowley et al. | 455/456.2 |
| 2007/0112460 | A1* | 5/2007 | Kiselik | 700/233 |
| 2007/0124469 | A1* | 5/2007 | Mohammed et al. | 709/225 |
| 2007/0239787 | A1* | 10/2007 | Cunningham et al. | 707/104.1 |
| 2007/0250901 | A1* | 10/2007 | McIntire | H04N 7/17318 725/146 |
| 2007/0281716 | A1* | 12/2007 | Altman et al. | 455/466 |
| 2007/0297590 | A1* | 12/2007 | Macbeth et al. | 379/201.02 |
| 2007/0299631 | A1* | 12/2007 | Macbeth et al. | 702/187 |
| 2008/0070593 | A1* | 3/2008 | Altman et al. | 455/457 |
| 2008/0077529 | A1* | 3/2008 | Swanburg | 705/45 |
| 2008/0147659 | A1* | 6/2008 | Chen et al. | 707/7 |
| 2008/0275979 | A1* | 11/2008 | Saba | 709/223 |
| 2009/0152349 | A1* | 6/2009 | Bonev et al. | 235/383 |
| 2009/0201896 | A1* | 8/2009 | Davis et al. | 370/338 |
| 2009/0234735 | A1* | 9/2009 | Maurer | 705/14 |
| 2009/0299907 | A1* | 12/2009 | Cofano et al. | 705/80 |
| 2010/0100447 | A1* | 4/2010 | Ganz | 705/14.66 |
| 2010/0180232 | A1* | 7/2010 | Honan et al. | 715/811 |
| 2010/0251139 | A1* | 9/2010 | Vance | G06Q 10/109 715/753 |
| 2010/0257460 | A1* | 10/2010 | Zaner et al. | 715/753 |
| 2011/0034158 | A1* | 2/2011 | Bradley et al. | 455/418 |
| 2011/0035384 | A1* | 2/2011 | Qiu | 707/748 |
| 2011/0047478 | A1* | 2/2011 | Ellsworth | G06F 9/543 715/747 |
| 2011/0197147 | A1* | 8/2011 | Fai | 715/753 |
| 2011/0238755 | A1* | 9/2011 | Khan et al. | 709/204 |
| 2011/0282750 | A1* | 11/2011 | Rosen | 705/14.66 |
| 2011/0302209 | A1* | 12/2011 | Flinn et al. | 707/780 |
| 2012/0023554 | A1* | 1/2012 | Murgia | H04L 63/102 726/4 |
| 2012/0072529 | A1* | 3/2012 | Ahopelto | 709/217 |
| 2012/0144343 | A1* | 6/2012 | Tseng | 715/834 |
| 2012/0149309 | A1* | 6/2012 | Hubner et al. | 455/67.11 |
| 2012/0197723 | A1* | 8/2012 | Watfa | G06Q 30/0261 705/14.58 |
| 2012/0221639 | A1* | 8/2012 | Mallet et al. | 709/204 |
| 2012/0238285 | A1* | 9/2012 | Yariv et al. | 455/456.1 |
| 2012/0271883 | A1* | 10/2012 | Montoya | H04W 4/023 709/204 |
| 2012/0278740 | A1* | 11/2012 | Robinson et al. | 715/757 |
| 2012/0287034 | A1* | 11/2012 | Park et al. | 345/156 |
| 2012/0323909 | A1* | 12/2012 | Behforooz | G06F 17/3053 707/728 |
| 2013/0013689 | A1* | 1/2013 | Crawford | 709/204 |
| 2013/0031470 | A1* | 1/2013 | Daly et al. | 715/243 |
| 2013/0050063 | A1* | 2/2013 | Poornachandran et al. | 345/2.1 |
| 2013/0080881 | A1* | 3/2013 | Goodspeed et al. | 715/251 |
| 2013/0089007 | A1* | 4/2013 | Ristock | 370/260 |
| 2013/0091208 | A1* | 4/2013 | Rajakarunanayake et al. | 709/204 |
| 2013/0091213 | A1* | 4/2013 | Diab et al. | 709/204 |
| 2013/0117292 | A1* | 5/2013 | Axelrod | G06Q 10/06 707/758 |
| 2013/0167042 | A1* | 6/2013 | Smith et al. | 715/753 |
| 2013/0267249 | A1* | 10/2013 | Rosenberg | 455/456.3 |
| 2013/0311598 | A1* | 11/2013 | Arrouye et al. | 709/217 |
| 2014/0032576 | A1* | 1/2014 | Swineford et al. | 707/756 |
| 2014/0129942 | A1* | 5/2014 | Rathod | 715/720 |
| 2014/0200963 | A1* | 7/2014 | Abhyanker | 705/7.34 |
| 2015/0019273 | A1* | 1/2015 | Grosz | 705/5 |

* cited by examiner

COMPILATION AND PRESENTATION OF USER ACTIVITY INFORMATION

BACKGROUND

A personal device, such as a mobile phone, media player, or tablet computer, can be carried by and used by a person to, for example, communicate with others, consume content, search for information, and the like. Personal devices, while often mobile and efficient, may have limited functionality and content creation and consumption capabilities, including small or low resolution displays, low quality speakers, and limited computing power. Purpose-built computing and media devices, such as desktop computers, server computers, televisions, and set-top boxes provide powerful content creation capabilities or rich content consumption experiences. Some devices, such as those equipped with large high definition displays, high fidelity audio processing equipment and speakers, and large amounts of computing power may provide both content creation and consumption capabilities that are superior to those of a mobile personal device.

Social networking web sites and other systems may track user activities and present information about the activities to other users, such as the user's social network contacts. Some systems may present information to only some portion of a user's contacts. If a user or a group of users wishes to share a selection of information about their recent activities with each other, including activities performed outside of a social network context, and also augment the activity information with supplemental or explanatory information or exhibits, a user can manually create a summary or other presentation. For example, a user can manually search for, identify and collect information from one or more personal devices or services, manually create a presentation or other summary of the information, and then manually provide the prepared presentation for display to the group of users on a suitable media device.

BRIEF DESCRIPTION OF THE DRAWINGS

Throughout the drawings, reference numbers may be reused to indicate correspondence between referenced elements. The drawings are provided to illustrate example embodiments described herein and are not intended to limit the scope of the disclosure.

FIG. 2 is a block diagram of an illustrative personal device including multiple modules for interacting with content, communicating with other devices, and the like.

DETAILED DESCRIPTION

Introduction

Figure 1:
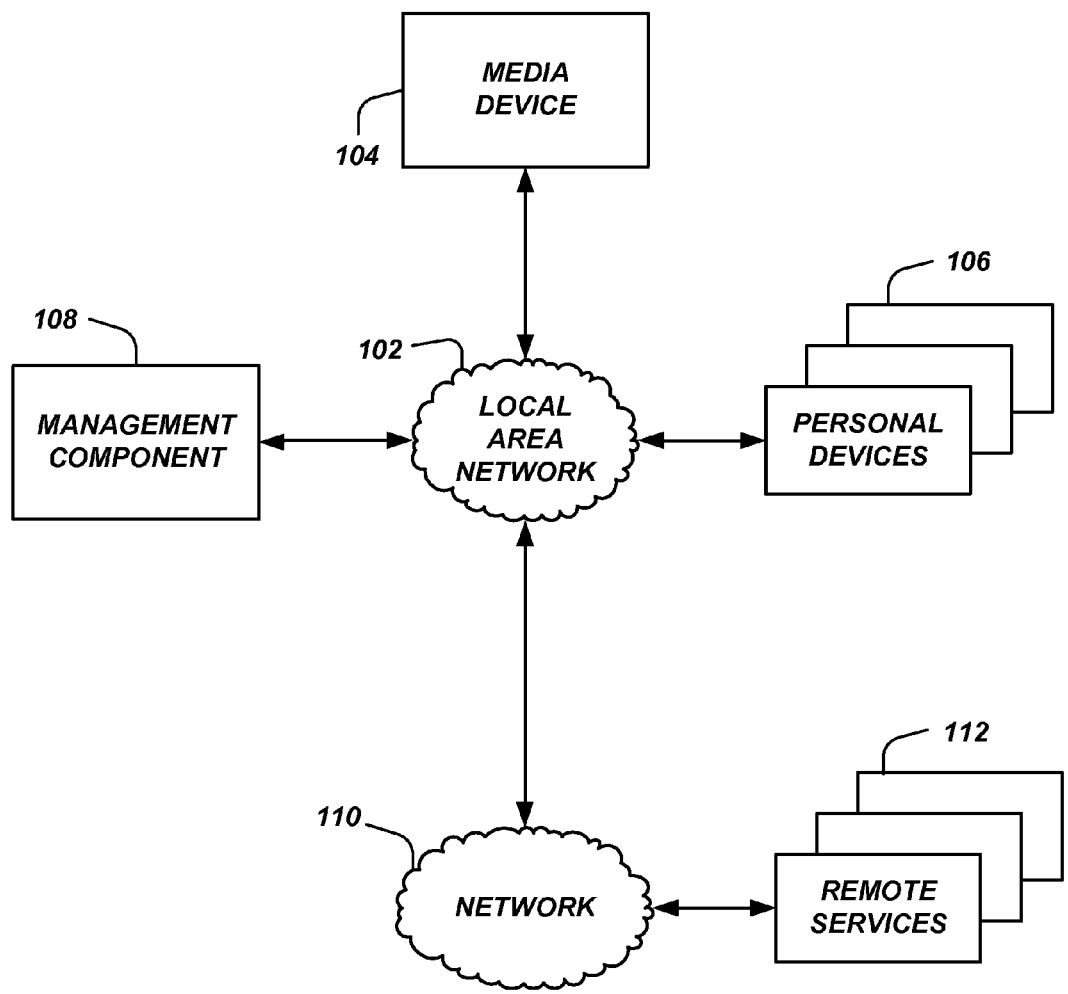
FIG. 1 is a block diagram of an illustrative network environment including a local area network, a management component, a media device, multiple personal devices, and multiple remote services.

Generally described, the present disclosure relates to the compilation of user data from a number of different personal devices into a presentation for display to a group of users of the personal devices. For example, aspects of the present disclosure relate to the tracking, by a personal device, of activities performed by a user of the personal device, such as communications, travel, content consumption, and the like. Data regarding the activities can be transferred from any number of personal devices to a management component, which can combine the data into a multimedia presentation summarizing or otherwise associated with the activities of the users.

In some embodiments, supplemental data may be obtained in order to augment the presentation. For example, images, maps, videos, and the like may be obtained from web services or other network-accessible systems. The supplemental content may aid in explaining or otherwise presenting the user activities. The supplemental data may also be independent of the user data received from the personal devices. Thus, supplemental data may include data not obtained from the user's personal devices. For example, the supplemental data may be data received from a social networking service with which a user has an account. The social networking data, such as friends, photos, comments, and other social interactions may be included in the generated presentation.

Additional aspects of the disclosure relate to the grouping of users according to predetermined associations, dynamically determined common interests, real-world relationships, and other connections or similarities. Presentations generated for each group may be different, based on the interests and relationships of the group. Templates may be used to predetermine which pieces of user data will be emphasized, and which pieces will not be used in a particular presentation regardless of any use of the data in other presentation templates associated with other user groups.

Although aspects of the embodiments described in the disclosure will focus, for the purpose of illustration, on a management component receiving user data from personal devices, retrieving supplemental data from remote services, and generating presentations for playback on media devices, one skilled in the art will appreciate that the techniques disclosed herein may be applied to any number of software processes or applications. Further, although various aspects of the disclosure will be described with regard to illustrative examples and embodiments, one skilled in the art will appreciate that the disclosed embodiments and examples should not be construed as limiting.

Various aspects of the disclosure will now be described with regard to certain examples and embodiments, which are intended to illustrate but not limit the disclosure. With reference to an illustrative example, a personal device, such as a mobile phone, may be carried by a user thought the day or a portion of the day. The device may be used to communicate with others, access and consume content, track personal schedules, and so on. Many such devices include capabilities for determining and tracking the location and movement of the device, such as a global positioning system (GPS) antenna and associated software, and for connecting with other devices, such as via wireless communication links. The device may include sensors, such as cameras and microphones, for capturing still images, videos, or audible sound (e.g., voices, music, etc.). The device may include sensors for measuring the attitude, orientation and movement of the device. For example, the device may include accelerometers, gyroscopes, and geomagnetic sensors. The device may be equipped to receive and send text or multimedia messages, such as SMS and MMS messages.

As multiple users of such personal devices come together, they may wish to exchange information about activities they have undertaken that day, since they last met, or during some other period of time. In order to facilitate such an exchange, multimedia presentations can be automatically generated from user data stored within the personal devices so that the users can, for example, view summaries of each other's activities. Groups of users may have certain relationships or common interests which may be considered when generating a presentation. For example, the presentation that is generated for a family may be different from a presentation that is generated for a group of adolescent friends, which may be different from a presentation that is generated for a members of a club or organization, and so on. The presentation that is generated may include, but is not limited to: visual elements, such as pictures, animations, and informational graphics; audio elements, such as music, voice recordings, and sound effects; and textual elements, such as communication transcriptions, reviews, written content, and the like. Moreover, the presentation may be tailored to the particular media device on which it will be shown or otherwise executed. For example, presentations for display on a high definition television may be created differently than presentations targeted to hand-held devices such as tablet computers.

Users may initiate a connection with a management component, such as a computer or smart television, in order to transfer information from their personal devices to the management component. The connection and transfer may be initiated by users individually or as a group, or in some cases may happen automatically when a user enters a communication range of the management component. User data transferred to the management component can include information about communications that a user has initiated or received on the personal device, such as telephone call logs, email histories, text messages, multimedia messages, and the like. User data may also include personal schedules and travel routes and information about content that user has consumed on the personal device. User data may include data from one or more of the device's sensors. Virtually any data regarding user activities performed with a personal device may be recorded and transferred to the management component.

Optionally, in response to receiving the user data, the management component can retrieve additional data from third party sources to supplement the user data. For example, some users may participate in social networks. Information regarding a user's social network communications and activities may not be available on the personal device for transfer to the management component, particularly in cases where the user has interacted with the social networking system using a different device. In such cases, the management component can be provided with access to a user's social networking profile, and the management component can access the social networking system via an application programming interface (API) to retrieve additional data about the user's activities for inclusion in the presentation where appropriate. For example, the social networking system may have videos or photographs posted by the user and/or in which the user is tagged. The social networking system may also include postings or other information regarding which restaurants the user has eaten at and when, where the user has shopped and when, and so on. The social networking system may also store information posted by the user or by other users (e.g., the user's friends) indicating who accompanied the user or participated with the user with respect to a given activity. In some cases, third-party services may transmit data, via an API, to the management component or a system associated with the management component for inclusion in presentations. Supplemental data may also be retrieved to augment the user data. For example, information about a location visited by a user may be retrieved and included in the presentation. The information can include maps, pictures, reviews, and the like.

Network Environment

Prior to describing embodiments of the multimedia presentation generation process in detail, an example network environment in which the process may be implemented will be described. FIG. 1 illustrates a network environment including a network, such as local area network (LAN) 102, a media device 104, any number of personal devices 106, and a management component 108. The LAN 102 may include one or more switches, routers, cable modems, ADSL modems, etc. The management component 108 may communicate with any number of remote services 112 via the LAN 102 and another communication network 110. The communication network 110 may be any wired network, wireless network, or combination thereof. In addition, the communication network 110 may be a personal area network, local area network, wide area network, cable network, satellite network, cellular telephone network, or combination thereof. For example, the communication network 110 may be a publicly accessible network of linked networks, possibly operated by various distinct parties, such as the Internet. In some embodiments, the LAN 102 or the communication network 110 may be a private or semi-private network, such as a corporate or university intranet. Protocols and components for communicating via the Internet or any of the other aforementioned types of communication networks are well known to those skilled in the art of computer communications and thus, need not be described in more detail herein.

The personal devices 106 can correspond to a wide variety of electronic devices. In some embodiments, the personal devices 106 are mobile devices that include one or more processors and a memory which may contain software applications executed by the processors. The personal devices 106 may include speakers and/or displays for presenting content. In addition, the personal devices 106 may be configured with one or more wireless network antennae to facilitate wireless communication with other devices, and a global positioning system (GPS) antenna, WiFi antenna, and/or cellular antenna so that the personal devices 106 may be aware of their geographical locations. The personal devices 106 may also be configured to determine their location via cell tower and/or WiFi signal triangulation, cell ID information, WiFi location information, near field connections, and otherwise. Illustratively, the personal devices 106 may include mobile phones, personal digital assistants (PDAs), mobile gaming devices, media players, electronic book readers, tablet computers, laptop computers, and the like. The software of the personal devices 106 may include components for establishing communications over networks 102, 110. In addition, the software applications may include communication applications which facilitate voice, text, video, and other types of communication, as described in detail below with respect to FIG. 2.

The LAN 102 may connect the media device 104, personal devices 106, and a management component 108 via a wireless communication link, such as a WiFi link. In such cases, the LAN 102 may be or include a wireless local area network (WLAN). Additionally, the LAN 102 may connect to the network 110, facilitating communication between various devices and components communicating over the LAN 102 and the devices and components connected to the network 110, such as the remote services 112. In some embodiments, the components networked to the LAN 102 may communicate over a combination of wired and wireless communication links. For example, the LAN 102 may be networked to a management component 108 (which may be a single management component or may include multiple management components) in communication with one or more media devices 104 via a wired communication link, such as an Ethernet connection. Due to the mobile nature and wireless connectivity of many personal devices 106, the LAN 102 may network any number of personal devices 106, and the number may change over time or from minute to minute. Personal devices 106 may communicate with the management component 108 via a WiFi connection.

The media device 104 can correspond to a wide variety of electronic devices. In some embodiments, the media device 104 can include audio or visual output components, such as speakers or video screens. For example, the media device 104 may be a television, digital video recorder (DVRs), set-top box, desktop computer, server computer, and the like. In some embodiments, a media device 104 may include one or more processors and a storage or memory which may contain software applications executed by the processors. The software of the media device 104 may include components for establishing communications over the LAN 102 and network 110. In addition, the software applications may include multimedia applications which play or otherwise execute audiovisual programs such as movies, television shows, streaming video, video games, multimedia presentations, and the like. The software applications and hardware components of the media device 104 may also perform the functions of the management component 108, as described herein. In some embodiments, the media device 104 may correspond to a personal device 106. Accordingly, a user may contribute to a presentation and consume the presentation using the same personal device 106.

The management component 108 illustrated in FIG. 1 may correspond to a computing device configured to receive data from personal devices 106 and remote services 112, prepare multimedia presentations based on the data, and output the multimedia presentations to the media device 104. For example, the management component 108 may include one or more processors and a computer storage or memory which contains software applications executed by the processors to provide the services described herein. In some embodiments, the management component 108 may be coupled to or integrated into a media device 104, as described above. For example, a smart television or set-top box may include a combination of software and hardware which provide the services of the management component 108.

The remote service 112 illustrated in FIG. 1 may correspond to a logical association of one or more computing devices configured to host information and respond to requests for information from computing devices via the network 110. For example, a remote service 112 may include one or more servers hosting content an information, such as a web page or a web service. Remote services 112 may also include a remote storage provider of database services and other storage services, a remote provider of computing capacity, and the like. The content and other information hosted or provided by a remote service 112 may be used to supplement information received, by the management component 108, from the personal devices 106. For example, maps, news, reviews, and the like may be retrieved from one or more remote services 112 to supplement information received from the personal devices 106 during the creation of a multimedia presentation. In some embodiments, a remote service 112 incorporates the functionality of the management component 108 so that a user does not have to employ user equipment to host the management component 108. In further embodiments, the remote service 112 and/or the management component 108 are provided by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In some embodiments, the network environment may include additional or fewer components that those illustrated in FIG. 1. For example, the network environment may include additional LANs 102 which personal devices 106 may or may not join in addition to the LAN 102 illustrated in FIG. 1. In another example, the network environment may not include a remote service 112. In such a case, the services provided by the remote service 112 may instead be provided by one or more components connected to the LAN 102, may be provided by the management component 108, or may not be provided.

Example Personal Device

Figure 2:
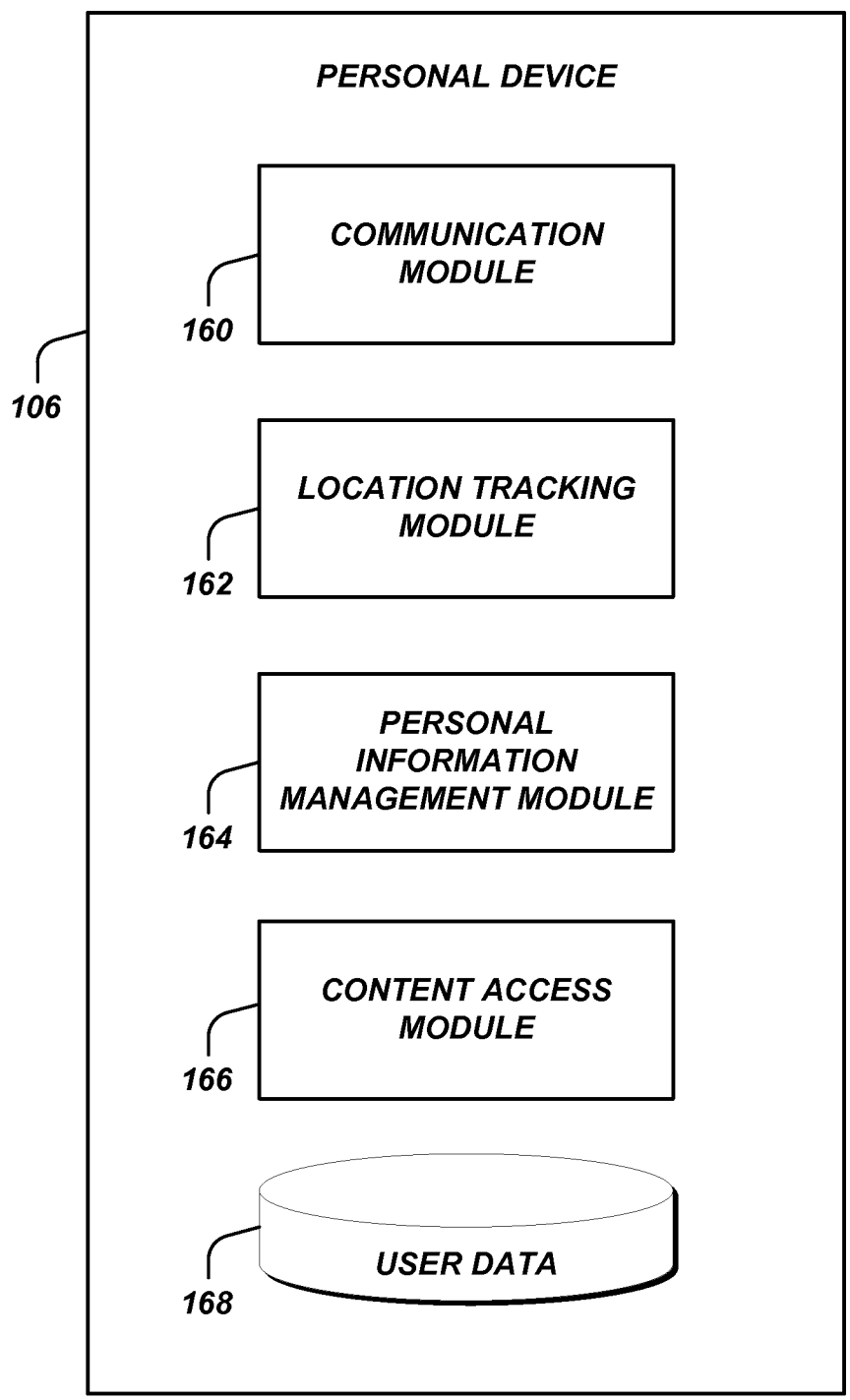

Turning now to FIG. 2, an illustrative personal device 106 including several modules and data stores will be described. As described above, a personal device 106 may be a portable electronic device carried by a user throughout the day. The user may interact with the personal device 106 to communicate with other users, access content, execute applications, track personal appointments, and the like. Information regarding these and other activities performed by the user may be recorded by the personal device 106 and stored within an integrated data store. Optionally, information may be transmitted to a remote service 112 for storage. When one or more users wish to have a multimedia presentation generated from the user information tracked by their respective personal devices 106, the users may connect the personal devices 106 to a management component 108 and transfer some or all of their user data. Information about the users' activities with the personal device 106, such as appointments, work- or school-related functions, lunch locations, exercise habits, extracurricular and other activities, and the like may be used by a management component 108 as described herein to generate a presentation of the user's life over a period of time.

The illustrative personal device 106 of FIG. 2 includes a communication module 160, a location tracking module 162, a personal information management (PIM) module 164, a content access module 166, and a user data store 168. In some embodiments, a personal device 106 may have additional or fewer components than those illustrated in FIG. 2. For example, a personal device 106 may include content creation modules, such as software applications for word processing or image editing. Optionally, a personal device 106 may not include a location tracking module 162. Other combinations are possible.

The communication module 160 may provide various communication services to the user of the personal device 106. For example, if the personal device 106 is a mobile phone or some other device configured to communicate via wireless telephone networks, such as code division multiple access (CDMA) and global system for mobile communications (GSM) networks, the communication module 160 can provide telephony and text messaging services. In some embodiments, the communication module 160 may facilitate the transfer of multimedia messages, such as picture or video messages, which may or may not include voice or text. Other types of communications may include email, instant message, video calling, and the like.

Data regarding the various communications transmitted or received by the communication module 160 or some other module of the personal device 106 may be stored in the user data store 168. For example, if a user makes a phone call to another user, information such as the identity of the other user, the date, time, and length of the phone call, the location of the user during the call, the location of the other party to the call, and/or other information may be stored in the user data store 168 for later transmission to the management component 108. In another example, the contents of an email or text message may be stored in the user data store 168 for later transmission to the management component 108. The management component 108 may process the contents of the communication for keywords and the like, as described in detail below, so that the management component 108 may retrieve applicable supplemental information to include in a multimedia presentation.

The location tracking module 162 may track the location of the personal device 106 and, by extension, the user of the personal device 106. For example, the personal device 106 may include a global positioning system (GPS) antenna to aid in determining the geographic location of the personal device 106 and any movements over a period of time. The user's location may also be tracked using cell phone tower triangulation information, WiFi information, or otherwise. Information about speed and direction may be tracked to determine, for example, whether the user is walking or driving. Other techniques may be used to track the location of the personal device 106, such as cellular triangulation, geolocation based on network connectivity, or manual user entry of location. The information tracked by the location tracking module 162 may be stored in the user data store 168. Additionally, the location information may be linked to information from other modules of the personal device 106. For example, the location of the personal device 106 may be recorded when the user initiates a phone call or accesses content.

The PIM module 164 may include various organizational features, such as a schedule or planner, an appointment calendar, a contact or address book, a "to do" or task list, and others. Such features are often available in, for example, mobile phones, personal digital assistants (PDAs), laptop computers, and tablet computers. For example, a schedule or planner may be included in a mobile phone, and may automatically synchronize with a schedule on a desktop computer, a corporate server, etc. The information used and recorded by the PIM may also be tracked for transfer to, and use by, the management component 108. For example, the information may be mirrored in the user data store 168, or transferred directly from the PIM module 164. A user's appointment and completed tasks may be used by the management component 108 to present an overview of the user's day, and may be supplemented with information from a remote service 112, such as a map of the location of a meeting, a menu of a restaurant at which the user had lunch, or a picture associated with a completed task.

The content access module 166 may provide the user of the personal device 106 with access to network content, such as web pages, streaming audio and video, and other types of network-accessible and other content. For example, the content access module 166 may provide a web browser application for viewing web pages and conducting searches. Information about the viewed web pages and searches may typically be saved in a "history" file or database associated with the browser. Such data may also be stored in the user data store 168 for transmission to the management component 108, or may be transmitted directly to the management component from the history of the web browser. Information may be linked to other information. Such links may be useful to the management component 108 when assembling a multimedia presentation. For example, the user of the personal device 106 may access a social networking web site, establish links with other users of the social networking web site, exchange information and content, such as pictures and videos, with the linked users, and the like. Information about where a user is when performing such tasks may be tracked and used to present an overview of what a user did with at a particular geographic location.

The content access module 166 may include additional software or provide additional services. For example, a user may watch videos stored on the personal device 108 or streamed over a network connection, listen to music, view images that were taken with a camera integrated into the personal device 108, and the like. Each of these activities may provide additional insight into the user's day (or other applicable time period), and therefore may be candidates for transfer to a management component 108 for inclusion in a multimedia presentation.

Example Management Component

Figure 3:
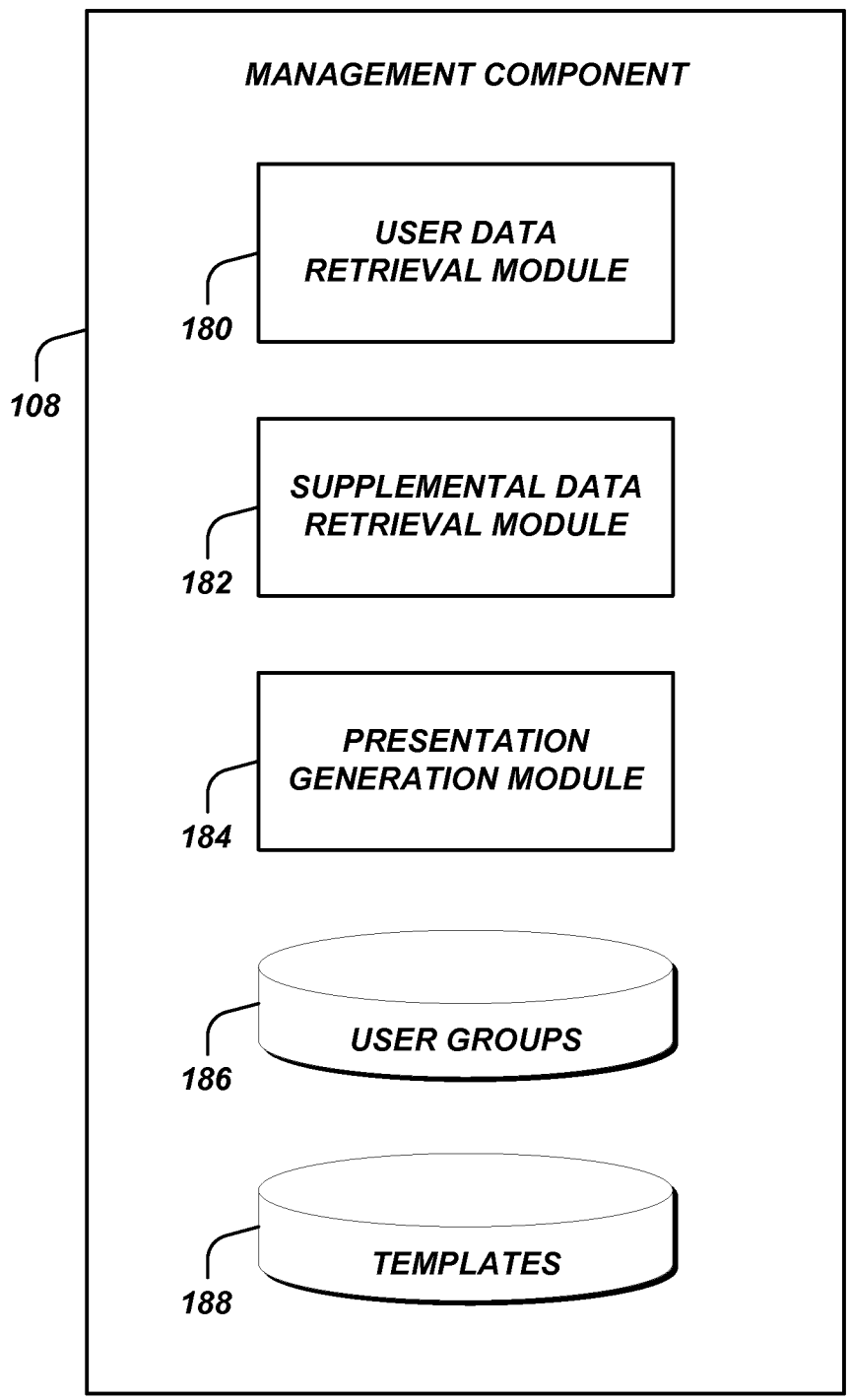
FIG. 3 is a block diagram of an illustrative management component including multiple modules for retrieving data and generating multimedia presentations.

Turning now to FIG. 3, an illustrative management component 108 including several modules and data stores will be described. As described above, a management component 108 may include one or more computing devices configured to execute software modules to provide the services of the management component 108. For example, a management component 108 may include one or more processors, a computer-readable memory such as random access memory (RAM), read-only memory (ROM), flash memory, a hard drive, and the like. Software programs may be stored in the memory and may cause the processors to execute routines for receiving data from any number of personal devices 106 and remote services 112, and for assembling a multimedia presentation for display on a media device 104 based on the received data and other data, such as templates, user group definitions, and the like. Data received from personal devices 106 can include appointment and location information, communications, and content access information. The management component 108 can retrieve supplemental information, such as a map and a menu corresponding to a lunch appointment, and compile the information into a series of slides or informational graphics for display to a group of users.

The illustrative management component of FIG. 3 includes a user data retrieval module 180, a supplemental data retrieval module 182, a presentation generation module 184, a user group data store 186, and a template data store 188. In some embodiments, the management component 108 may include additional or fewer components than those illustrated in FIG. 3. For example, a management component 108 may not include a supplemental data retrieval module 182, but rather a supplemental data store. Such a configuration may occur in embodiments in which the management component 108 does not retrieve supplemental data from a remote service 112, but rather keeps or otherwise has access to a repository of supplementation information to use when generating multimedia presentations.

The user data retrieval module 180 can retrieve data from any number of personal devices 106. For example, if several users of personal devices 106 wish to initiate the process of generating a multimedia presentation based on their own user data, the users may connect their personal devices 106 via a wireless network connection (or some other connection) with the management component 108. The user data may then be automatically uploaded from the personal devices (e.g., from the user data store 168) to the user data retrieval module 180 of the management component 182.

As described below with respect to FIG. 4, the management component may consult the user group data 186 to determine which user group includes each of the users or personal devices 106 from which user data has been retrieved. The user groups may be defined in the user group data 186 through a series of relational database records specifying which users or personal devices 106 belong to which group or groups. Optionally, the user groups may be defined by common user characteristics, such as users who visit a common location, eat at a common restaurant, share a common work schedule, browse the similar content, have identified each other as friends on a social network site, etc. Records associating such characteristics to one or more groups may be stored in the user group data 186. The records in the user group data 186 may be entered and maintained by one or more users, may be determined over a period of time via a computer learning algorithm, may be a static set of user groups, or some combination thereof.

The supplemental data retrieval module 182 may be employed by the management component 108 to retrieve supplemental data from remote services 112. For example, during the process of generating a multimedia presentation, the management component 108 may determine that an image, review, map, graphic, audio recording, or some other content or information may be required by a particular presentation template or otherwise enhance a presentation generally or one based on a particular template. The supplemental data retrieval module 182 may connect with a remote service 112 via a network connection, such as the networks 102, 110 illustrated in FIG. 1. The supplemental data retrieval module 182 may include or otherwise have access to a listing of remote services 112 from which to retrieve particular types of supplemental data. For example, the supplemental data retrieval module 182 may be used to retrieve a map of a location associated with an appointment or other activity of a user. The supplemental data retrieval module 182 may have access to a network address of a remote service 112 which provides such map, and can contact the remote service 112 to retrieve the map. The map can then be used by the presentation generation module 184 during generation of the multimedia presentation.

The presentation generation module 184 can compile the data received via the user data retrieval module 180 from the personal devices 106, the data received via the supplemental data retrieval module 182 from the remote services 112, and one or more templates 188 to generate a multimedia presentation. A template 188 may be associated with each user group. For example, a group of family members may be associated with a template 188 which provides layout or other configuration details regarding presenting the schedule of each user, while a group of friends may be associated with a different template which provides layout other configuration details regarding presenting the content that each user has accessed. The templates 188 may be predefined within the management component 108, may be created by a user or administrator of the management component 108, may be dynamically determined based on attributes of the group, or some combination thereof. Templates 188 may include detailed instructions for assembling a multimedia presentation, such as a predefined slide show with spaces to insert user data and supplemental data. In some embodiments, templates 188 may be more flexible, such as a record or group of records containing guidelines for assembling a multimedia presentation based on any number of static or dynamic factors.

In some embodiments, templates may also or alternatively be associated with individual users. A user may select, create, or otherwise be associated with a first template for sharing information with friends, a second template for sharing information with family members, and so on. Illustratively, the first template that the user is associated with may be based on a generic template for sharing information with friends. The information that a user exposes through use of first template may be similar to what other friends expose, or it may customized to include some data and exclude other data.

In some cases, users may be automatically grouped together into sub groups, such as based on predetermined relationships (e.g., married couples, colleagues, teammates). In such cases, information about each member of the subgroup may be presented together, optionally through the user of a separate template. For example, a presentation may be generated based on data received from a group of participating users, with each user's information presented separately. At some subsequent time, a spouse of a participating user may arrive and wish to contribute to the presentation. The spouse's information may be combine with the previously participating user, and in some cases may involve the use of a different template.

Presentation Generation Process

Figure 4:
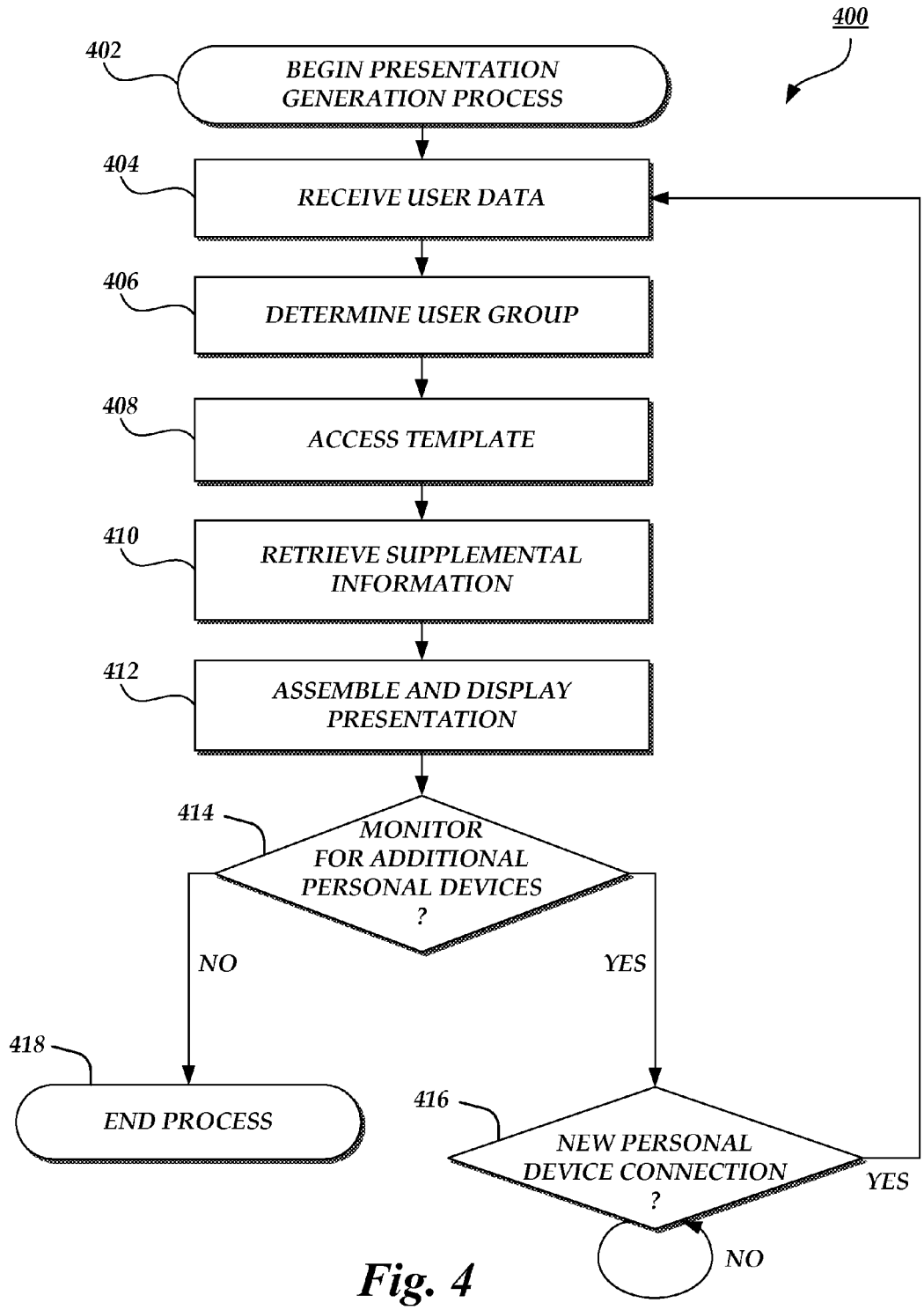
FIG. 4 is a flow diagram of an illustrative routine for generating a multimedia presentation, for display on a media device, based at least partly on data received from personal devices and remote services.

FIG. 4 illustrates a sample routine 400 for generating a presentation based on user data received from personal devices 106. The routine 400 may be implemented by a management component 108 or a media device 104. The routine 400 can be implemented as a software program or collection of programs residing within non-transitory computer storage, such as RAM, ROM, a hard disk, or the like, of a computing device associated with the management component 108 or a media device 104.

The routine 400 begins at block 402. The routine 400 may be a background process that executes continuously on a management component 108, a media device 104, or some other entity within a LAN 102. Alternatively, the routine 400 may be instantiated whenever one or more personal devices 106 connect to the management component 108, optionally requesting initiation of the presentation generation process. When the routine 400 is initiated, the executable program instructions can be loaded into memory, such as RAM, and executed by one or more processors of computing system. In some embodiments, the computing system may include multiple computing devices, such as servers, and the routine 400 may be executed by multiple servers, serially or in parallel.

Figure 5:
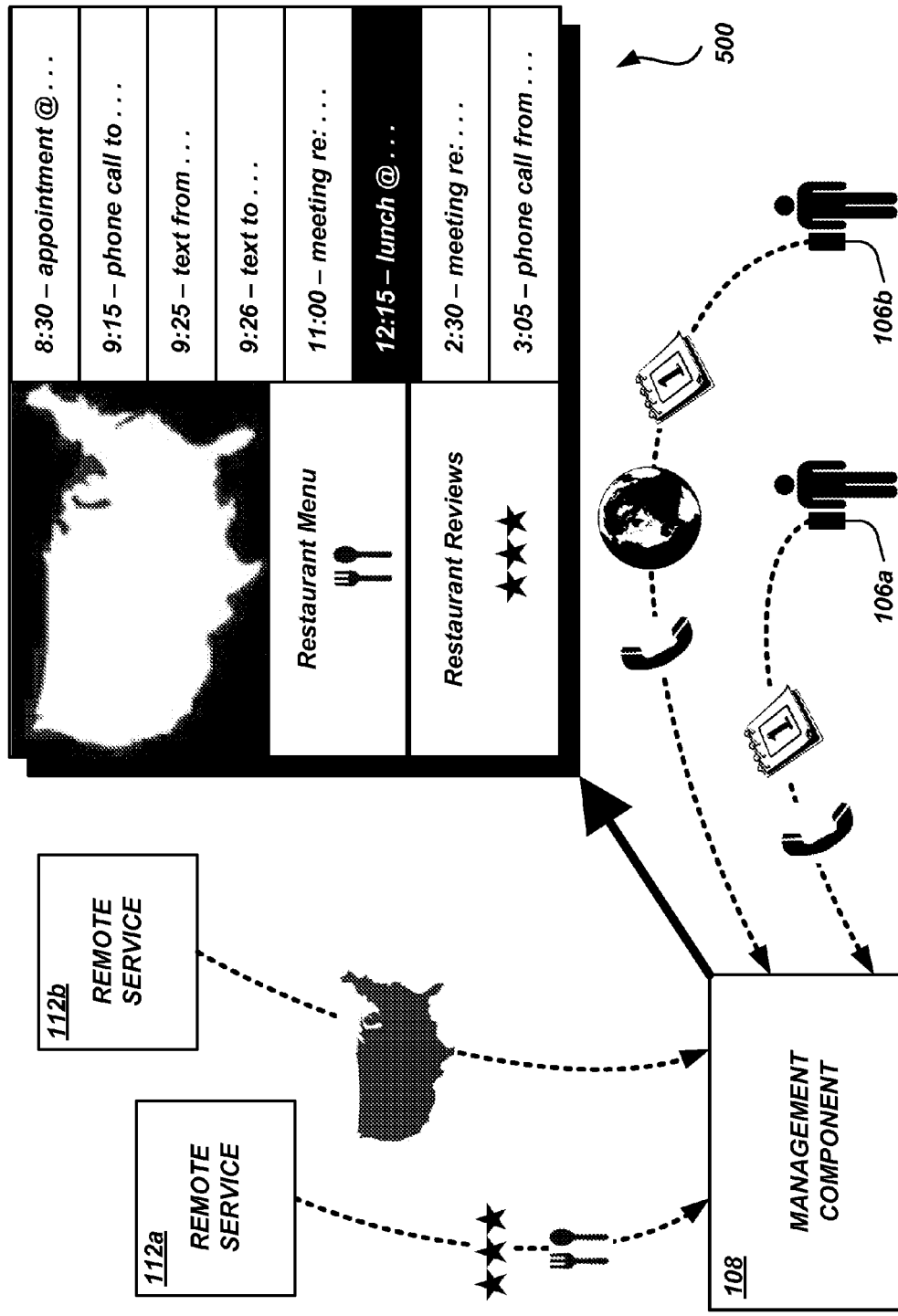
FIG. 5 is a block diagram of illustrative interactions between multiple personal devices, a management component, and multiple remote services to generate a multimedia presentation.

At block 404, the management component 108 or other system executing the routine 400 can obtain user data from the various personal devices 106 in communication with the management component 108 or otherwise participating in the routine 400. As described above, the data may be transferred from a user data store 168 or some other component of each personal device 106. FIG. 5 illustrates one embodiment of the generation of a multimedia presentation 500. As shown in FIG. 5 and described in detail herein, a management component 108 can receive user data from multiple personal devices 106a, 106b. The user data can include communication records (voice, text, and/or multimedia), calendar entries (e.g., that identifies an event time, location, and/or participants), geolocation information (which may be continuous, periodic, and/or event triggered geolocation information), and the like.

At block 406, the management component 108 can determine whether the various personal devices 106 belong to any user groups, and if any user group includes each of the participating personal devices 106 participating. As described above, the various personal devices 106 or users thereof may be assigned to one or more user groups in the user group data store 184 of the management component 108. One implication of a user group assignment may be an association with a particular template 188 to serve as the basis of a presentation. Optionally, one or more of the personal devices 106 may specify a particular user group or a particular template to use for the current execution of the routine 400.

At block 408 the management component can access the template 188 associated with the current user group or otherwise associated with the current execution of the routine 400. The template 188 may define visual layouts for the presentation (e.g., color, font, size, transition), which user data to use in each portion of the presentation (e.g., all exercise-related data in one portion, all travel-related information in a second portion), which supplemental information to retrieve (e.g., maps, restaurant reviews, social network data), and the like.

At block 410, the management component 108 can retrieve supplemental information for the template or templates used during the current execution of the routine 400 and the user data provided by the personal devices 106. As shown in FIG. 5 and described in detail herein, a management component 108 can retrieve supplemental information from multiple remote services 112a, 112b. The supplemental data can include, for example, maps of locations visited or routes travelled, reviews of locations visited or activities performed, menus of restaurants visited, and other supplemental information associated with the activities of the users.

In some embodiments, the supplemental information may not be directly associated with user data received from the personal device 106a, 106b, but rather can be additional user data that is received from a remote service 112a, 112b. For example, a user may exercise, such as by walking or running, with no personal device, or with a personal device other than the personal device 106a, 106b which has transmitted data to the management component 108 (e.g., a GPS watch). Data regarding the exercise, such as a running route or a time period, may be saved to a remote service 112 by the user or another personal device. In another example, social network data may not be stored on a personal device 106a, 106b. The management component 108 can access a remote service 112a, 112b in order to retrieve information about the social network activities of a user. The user may provide a password or otherwise grant the management component 108 access to some or all of the user's social network profile information. The management component 108 can utilize APIs provided by the social network hosting service in order to retrieve the data for possible inclusion in the presentation. Such supplemental data may also be used by the management component 108 in determining which group or groups the users belong to. For example, interest information stored on a social network, linked friends, and other information can be obtained by the management component 108 through the APIs. Optionally, the management component 108 or some associated component may expose an API for remote services 112 and other entities to submit information to the management component 108.

At block 412, the management component 108 can assemble the presentation and display it on a media device 104. The presentation can be based on a template or on some other configuration or layout information. For example, the template may have been previously defined by a user and stored by the management component 108 or other data store. The presentation assembly may be automatically performed by the management component based on the predefined template, without requiring that the user manually provide input during the assembly process. As shown in FIG. 5, a presentation 500 can include images and informational graphics. For example, one personal device 106b may have a detailed daily schedule, including a number of appointments, and information about a number of phone calls, texts, and other communications. Additionally, the personal device 106b may have tracked information about the location of the personal device 106b and any changes thereto, such as driving or walking routes. Supplemental maps, reviews, and other content may be retrieved from remote services 112a, 112b. Such user data and supplementation information can be combined for display based on a template, as determined in block 408, above. A template may be assigned to the user or group of users currently participating in the process of generating a presentation 500. The template may include layout and formatting instructions for displaying the daily schedule combined with other information about the user's day, along with supplemental content and informational graphics to augment the user data. Any number of different layouts and configurations for the presentation 500 are possible. In some embodiments, information from more than one user may be combined into a single informational graphic, or separate graphics or other portions of the presentation may be reserved for each user. In some embodiments, the presentation 500 may include videos, animation, audio recordings, sound effects, and the like instead of or in addition to schedule and informational graphics. The presentation can be saved as a file for transfer a media device 104, such as a TV, for display. In some embodiments, the presentation can be streamed to the media device 104 rather than transferred as a file.

At decision block 414, the management component 108 can determine whether to monitor or otherwise remain available for connections from additional personal devices 106. If the management component 108 is to remain available for connections, the routine 400 can proceed to decision block 416. Otherwise, the routine 400 can proceed to block 418, where execution terminates.

For example, a group of users may connect their personal devices 106 to a management component 108, transmit user data, and view a presentation based on that user data. Subsequently, a new user may wish to transmit user data to add to the presentation. In such a case, execution of the routine 400 can return to block 404, where user data from the new personal device 106 is transmitted to the management component 108. From there, execution of the routine 400 can proceed as described above, and an updated presentation can be generated and displayed.

TERMINOLOGY

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for compiling and presenting user information, the system comprising:
a data store configured to store computer-executable instructions; and
a computing device in communication with the data store, the computing device, when executing the computer-executable instructions, configured to:
detect a first mobile device in a communication range of the computing device;
detect a second mobile device in the communication range of the computing device;
receive, from the first mobile device, first user activity data;
receive, from the second mobile device, second user activity data;
determine, based at least partly on the first user activity data and the second user activity data, that a first user of the first mobile device and a second user of the second mobile device each visited a common geographic location;
group the first user and the second user into a first group of users who have visited the common geographic location;
access a first template associated with the first group of users;
obtain, from a remote service, first supplemental information associated with an activity of at least one of the first user or the second user, wherein the activity of at least one of the first user or the second user is identified from at least one of the first user activity data or the second user activity data;
cause, at least in part, a multimedia presentation to be automatically assembled using the first user activity data, the second user activity data, the first supplemental information, and the first template;
cause, at least in part, a media device to display the multimedia presentation;
detect a third mobile device in the communication range of the computing device;
receive third user activity data from the third mobile device;
group at least the first user of the first group of users with a third user of the third mobile device into a second group of users based at least partly on a predetermined relationship between the first user and the third user;
access a second template associated with the second group of users;
obtain, from the remote service, second supplemental information associated with an activity of the third user, wherein the activity of the third user is identified from the third user activity data; and
update the multimedia presentation using the third user activity data, the second supplemental information, and the second template.

2. The system of claim 1, wherein the first mobile device or the second mobile device comprises at least one of a mobile phone, a media player, a personal digital assistant (PDA), a tablet computer, and a laptop computer, and wherein the media device comprises at least one of a television, a set-top box, a computing device, and a mobile device.

3. The system of claim 1, wherein the first user activity data comprises at least one of images captured via a first camera of the first mobile device or images captured via a second camera of the second mobile device, and wherein the activity identified in the first user activity data comprises at least one of an appointment, a change in geographical location, an electronic communication, a phone call, and a content interaction.

4. The system of claim 1, wherein the predetermined relationship between the first user and the third user comprises at least one of a marital relationship, a family relationship, or an organizational relationship, and wherein the second template is further associated with the predetermined relationship.

5. The system of claim 1, wherein the first user activity data is associated with a characteristic of the second group of users, and wherein a portion of the multimedia presentation regarding the first user is associated with the characteristic of the second group of users.

6. A computer-implemented method for compiling and presenting user information, the computer-implemented method comprising:
under control of one or more computing devices configured to execute specific computer-executable instructions,
detecting a first mobile device in a communication range of the one or more computing devices;
detecting a second mobile device in the communication range of the one or more computing devices;
receiving via one or more wireless communication links, first user activity data from the first mobile device;
receiving, via the one or more wireless communication links, second user activity data from the second mobile device;
determining, based at least partly on the first user activity data and the second user activity data, that a first user of the first mobile device and a second user of the second mobile device each visited a common geographic location;
placing data regarding the first user and data regarding the second user into a first data group comprising data regarding users who have visited the common geographic location;
retrieving, from a remote service, first supplemental information associated with an activity of at least one of the first user or the second user, wherein the activity of at least one of the first user or the second user is identified from at least one of the first user activity data or the second user activity data;
generating a first multimedia presentation using the first user activity data, the second user activity data, the first supplemental information, and a first template associated with the first data group;
detecting a third mobile device in the communication range of the one or more computing devices;
receiving, via the one or more wireless communication links, third user activity data from the third mobile device;
placing data regarding the first user and data regarding the third user into a second data group comprising data regarding users who have a predetermined relationship;
retrieving, from the remote service, second supplemental information associated with an activity of the third user, wherein the activity of the third user is identified from the third user activity data; and
generating a second multimedia presentation using the third user activity data, the second supplemental information, and a second template associated with the second data group.

7. The computer-implemented method of claim 6 wherein the first template comprises a layout for the presentation.

8. The computer-implemented method of claim 6 wherein the first template indicates at least a portion of the first user activity data to include in the presentation.

9. The computer-implemented method of claim 6 further comprising: determining, based at least partly on a layout configuration of the first template, which of the first user activity data or second user activity data not to include in the first multimedia presentation.

10. The computer-implemented method of claim 9, wherein the first template indicates at least a portion of the first supplemental information to include in the presentation.

11. The computer-implemented method of claim 6 further comprising causing a media device to display the first multimedia presentation.

12. The computer-implemented method of claim 11, wherein the first mobile device or the second mobile device comprises one of a mobile phone, a media player, a personal digital assistant (PDA), a tablet computer, or a laptop computer, and wherein the media device comprises one of a television, set-top box, a computing device, or mobile device.

13. The computer-implemented method of claim 6, wherein the predetermined relationship comprises at least one of a marital relationship, a family relationship, or an organizational relationship.

14. The computer-implemented method of claim 6, wherein determining that the first user and the second user each visited the common geographic location comprises:
obtaining, from the first mobile device, first user profile data related to visiting the common geographic location;
obtaining, from the second mobile device, second user profile data related to visiting the common geographic location; and
determining that the first user profile data and the second user profile data each relate to visiting the common geographic location.

15. A non-transitory computer readable medium comprising executable code that, when executed by a processor, causes a management component comprising one or more computing devices to perform a process comprising:
detecting a first mobile device in a communication range of the one or more computing devices;
detecting a second mobile device in the communication range of the one or more computing devices;
receiving first user activity data from the first mobile device;
receiving second user activity data from the second mobile device;
determining, based at least partly on the first user activity data and the second user activity data, that a first user of the first mobile device has a first relationship to a second of the second mobile device;
placing data regarding the first user and data regarding the second user into a first data group based at least partly on the first relationship;
receiving first supplemental information associated with at least one of the first user activity data or the second user activity data;
generating a first multimedia presentation using the first user activity data, the second user activity data, the first supplemental information, and a first template associated with the first data group;
detecting a third mobile device in the communication range of the one or more computing devices;
receiving third user activity data from the third mobile device;
determining, based at least party on the first user activity data and the third user activity data, that the first user has a second relationship to a third user of the third mobile device;
placing data regarding the first user and data regarding the third user into a second data group based at least partly on the second relationship;
receiving second supplemental information associated with the third user activity data;

generating a second multimedia presentation using the third user activity data, the second supplemental information, and a second template associated with the second data group.

16. The non-transitory computer readable medium of claim 15, wherein the first supplemental information is distinct from the first user activity data, wherein the first supplemental information comprises at least one of a map, image, video, review, and menu associated with an activity identified in the first user activity data.

17. The non-transitory computer readable medium of claim 16, wherein at least one of the first template or the second template indicates at least a portion of the first supplemental information to be included in the second multimedia presentation.

18. The non-transitory computer readable medium of claim 16, wherein the process further comprises:
receiving, from the first mobile device, first user profile data related to visiting a geographic location;
receiving, from the second mobile device, second user profile data related to visiting the geographic location; and
determining that the first user profile data and the second user profile data each relate to visiting the geographic location.

19. The non-transitory computer readable medium of claim 15, wherein generating the second multimedia presentation comprises using the first template in addition to the second template.

20. The non-transitory computer readable medium of claim 19, wherein the second supplemental information describes an aspect of a common geographic location visited by the first user and the third user.

21. The non-transitory computer readable medium of claim 15, the process further comprising causing a media device to display the second multimedia presentation.

22. The non-transitory computer readable medium of claim 21, wherein the first mobile device or the second mobile device comprises at least one of a mobile phone, a media player, a personal digital assistant (PDA), a tablet computer, and a laptop computer, and wherein the media device comprises at least one of a television, a set-top box, a computing device, and a mobile device.

23. The non-transitory computer readable medium of claim 15, wherein the first relationship comprises at least one of a marital relationship, a family relationship, or an organizational relationship.

24. The non-transitory computer readable medium of claim 23, wherein a portion of the second multimedia presentation regarding the first user is associated with the first relationship.

* * * * *